Patented July 9, 1946

2,403,748

UNITED STATES PATENT OFFICE 2,403,748

MANUFACTURE OF 2,6, DI-HALO PHENOLS

John F. Olin, Grosse Ile, Mich., assignor to Sharples Chemicals Inc., Philadelphia, Pa., a corporation of Delaware No Drawing. Application December 29, 1943, Serial No. 516,090

7 Claims. (Cl. 260—623)

The present invention relates to the preparation of 2,6, di-halo-phenols. Previous methods for the preparation of compounds of this type have involved complicated and relatively expensive operations such as the diazotization of 2,6, di-halo-aniline or the halogenation of sodium phenol sulfonate followed by hydrolysis of the resulting compound, or the decarboxylation of 3,5, di-halo-, or 4, hydroxy benzoic acid. An object of the present invention has been to produce the 2,6, di-substituted phenols by a simpler and more economical process than those of the prior art.

The present invention rests upon the discovery that the 2,6, di-halo-phenols may be prepared by dealkylation of 2,6, di-halo, 4 alkyl phenols in the presence of an alkyl acceptor and an alkylation catalyst. In the practice of the invention, an alkyl phenol may first be halogenated in accordance with the following equation:

1.
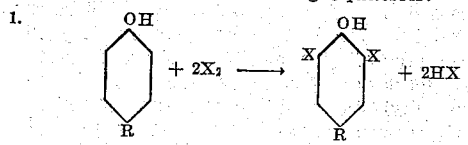

in which X represents halogen and R represents a tertiary alkyl radical. The resulting 2,6, dihalo, 4 tertiary alkyl phenol is then subjected to dealkylation in the presence of an alkyl acceptor. The alkyl acceptor may be any organic compound capable of combining with the alkyl radical of the 2,6, di-halo, 4 tertiary alkyl phenol, but is preferably an aromatic hydrocarbon. The step of dealkylation to form the desired dealkylated di-halo-phenol is preferably accomplished with the aid of a catalyst capable of causing alkylation of the alkyl acceptor, and at a temperature sufficiently high to cause attainment of a substantial state of equilibrium involving a large degree of dealkylation of the 2,6, di-halo, 4 tertiary alkyl phenol, and corresponding alkylation of the alkyl acceptor. In case an aromatic hydrocarbon such as benzene, toluene or xylene is used as the alkyl acceptor, the process of dealkylation may be represented by the following equation (using benzene as an illustration):

2.
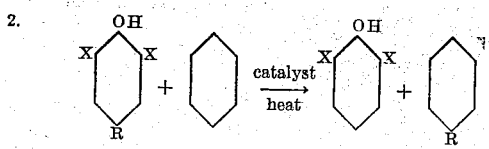

The invention may perhaps best be illustrated by a discussion of preferred conditions for the manufacture of 2,6, di-chloro-phenol and 2,6, dibromo-phenol. In manufacture of these compounds, in accordance with the preferred form of the invention, a tertiary alkyl phenol containing between 4 and 12 carbon atoms in the alkyl radical is first halogenated in a conventional manner, to produce a 2,6, di-halo, 4 tertiary alkyl phenol in accordance with equation 1, above. The resulting halogenated product is then mixed with the aromatic hydrocarbon which is to serve as the alkyl acceptor, and an alkylation catalyst is added to the mixture. The mixture is then heated and agitated for a period of time which ordinarily varies between 2 and 10 hours, depending upon the catalyst used and upon the temperature. The preferred catalysts for use in dealkylation of the halogenated product and alkylation of the alkyl acceptor, are aluminum chloride, boron trifluoride, ferric chloride, beryllium chloride, titanium chloride, zirconium chloride, hafnium chloride, thorium chloride, columbium penta-chloride, tantalum chloride, phosphorus pentoxide, phosphoric acid, sulfuric acid, hydrogen fluoride and acid clays, although any of the known catalysts which have heretofore been used for alkylation of aromatic hydrocarbons by treatment with olefins, alcohols or alkyl halides may be used in this reaction. The reaction temperature will ordinarily be within the range between 45 and 100° C., depending upon the other factors discussed above.

Any desired pressure, varying from sub-atmospheric to high super-atmospheric, may be employed, the preferred pressure range being between 0.75 and 50 atmospheres, since pressures below or above this range provide no particular advantage and require use of more expensive equipment.

The molar ratio of catalyst to halogenated product to be dealkylated is usually between 0.75 and 1.25:1 in cases in which one of the halides mentioned above is used as the catalyst; and in cases in which acid clays are used, the amount of catalyst should usually be between 2 and 10% of the weight of the halogenated phenol to be dealkylated.

In the practice of the invention, I prefer to use a large molecular excess of the aromatic hydrocarbon which is to serve as the alkyl acceptor. The use of such excess fulfills two important functions. In the first place, by maintaining a substantial molecular excess of the alkyl acceptor in the reaction mixture, the chemical reaction of equation 2 is pushed to the right, an obviously desirable result if a high and rapid conversion to the dealkylated halo-phenol product is desired. The second advantage in use of a large excess of an aromatic hydrocarbon as the alkyl acceptor is that this hydrocarbon serves both as a solvent and as a reactant in the practice of the process. For these reasons, I prefer to have the aromatic hydrocarbon which serves as the alkyl acceptor present in a molecular ratio of between 3:1 and 15:1 with respect to the halo-phenol to be dealkylated. The use of these high ratios is not, however, vitally necessary in the practice of the invention, since progress of the reaction to the right will occur to produce equilibrium involving substantial conversion to the desired product even in cases in which lesser ratios are employed, and a solvent such as naphtha, which does not enter into the reaction, may be used as a co-solvent in practice of the invention, in place of the large excess of alkyl acceptor.

While the preferred alkyl acceptors of the invention are aromatic hydrocarbons, they may be substituted by one or two alkyl radicals, as in the cases of toluene and xylene, or by hydroxyl radicals as in the case of phenols, or by various other radicals, the only important condition being that at least one reactive position be available on the alkyl acceptor for alkylation, and that the catalyst and other conditions be such as to cause such alkylation.

*Example I*

954 grams of xylene and 670 grams 2,6, dichloro, 4 tertiary amyl phenol were refluxed in glass equipment fitted with a decanter in order to completely dry the reactants. 28 grams of xylene were thus discarded in the drying operation. 440 grams of anhydrous aluminum chloride were added after the mixture cooled to 35° C. It was then heated with stirring for 3.5 hours at 65 to 95° C. Large quantities of hydrogen chloride were evolved. The product was then poured into ice to decompose the catalyst complex and washed several times with water. The oil layer was then fractionated up to 100° C. at 33 mm. 19 grams of intermediate fraction came over followed by 423 grams of a solid fraction distilling at 118 to 120° C. at 33 mm. This fraction was recrystallized from hexane at 0° C. and obtained as a white crystalline material melting at 65 to 67° C. and identified as 2,6, di-chlorophenol.

*Example II*

Into a 5 liter, 3-necked flask, fitted with a mercury seal stirrer, a thermometer well and a reflux condenser was charged 585 grams of 2,6, di-bromo, 4 tertiary amyl phenol, 770 grams of dry xylene and 267 grams anhydrous aluminum chloride. The mixture was heated at 20 to 25° C. for three hours and then worked up by decomposing the catalyst complex with ice, washing the oil layer with water several times and then extracting the combined water layers with toluene. The combined oil layers were fractionated. A cut boiling at 138° C. at 10 mm. was obtained which had a melting point of 55° C. and was 2,6, di-bromo phenol.

*Example III*

Boron trifluoride was substituted for aluminum chloride in an experiment similar to Example I.

Using the same charge of 2,6, di-chloro, 4 tertiary amyl phenol and xylene, the mixture was warmed to 60° C. and boron trifluoride was bubbled through with stirring for four hours. The product was worked up by the same method as Example I. 418 grams of 2,6, di-chloro phenol were thus obtained.

While the invention has been described specifically by reference to use of particular catalysts, particular tertiary alkyl radicals and particular alkyl acceptors, it is to be understood that these conditions may be varied greatly in the practice of the invention and have been set forth merely for the purpose of illustration. I do not, accordingly, wish to be limited in the interpretation of the invention except by the terms of the following claims.

I claim:

1. In the manufacture of 2,6, di-halo phenols, the process comprising halogenating a 4-tertiary alkyl phenol to form the corresponding 2,6, di-halo, 4-tertiary alkyl phenol, and thereafter catalytically dealkylating the resulting 2,6, di-halo, 4-tertiary alkyl phenol in the presence of an alkyl acceptor.

2. In the manufacture of 2,6, di-halo phenols, the process comprising halogenating a 4-tertiary alkyl phenol to form the corresponding 2,6, di-halo, 4-tertiary alkyl phenol, and thereafter catalytically dealkylating the resulting 2,6, di-halo, 4-tertiary alkyl phenol in the presence of an alkyl acceptor chosen from the class consisting of benzene, toluene, xylene and phenol.

3. In the manufacture of 2,6, di-halo phenols, the process comprising halogenating a 4-tertiary alkyl phenol to form the corresponding 2,6, di-halo, 4-tertiary alkyl phenol, and thereafter catalytically dealkylating the resulting 2,6, di-halo, 4-tertiary alkyl phenol in the presence of benzene.

4. In the manufacture of 2,6, di-halo phenols, the process comprising halogenating a 4-tertiary alkyl phenol to form the corresponding 2,6, di-halo, 4-tertiary alkyl phenol, and thereafter catalytically dealkylating the resulting 2,6, di-halo, 4-tertiary alkyl phenol in the presence of xylene.

5. In the manufacture of 2,6, di-halo phenols, the process comprising halogenating a 4-tertiary alkyl phenol to form the corresponding 2,6, di-halo, 4-tertiary alkyl phenol, and thereafter catalytically dealkylating the resulting 2,6, di-halo, 4-tertiary alkyl phenol in the presence of phenol.

6. In the manufacture of 2,6, di-halo phenols, the process comprising halogenating a 4-tertiary alkyl phenol to form the corresponding 2,6, di-halo, 4-tertiary alkyl phenol, and thereafter catalytically dealkylating the resulting 2,6, di-halo, 4-tertiary alkyl phenol in the presence of an aromatic hydrocarbon alkyl acceptor.

7. In the manufacture of 2,6, di-chloro phenols, the process comprising halogenating a 4-tertiary alkyl phenol to form the corresponding 2,6, di-chloro, 4-tertiary alkyl phenol, and thereafter catalytically dealkylating the resulting 2,6, di-chloro, 4-tertiary alkyl phenol in the presence of an alkyl acceptor chosen from the class consisting of benzene, toluene, xylene and phenol.

JOHN F. OLIN.